May 8, 1951   J. L. CHANEY   2,552,257
THERMOMETER ASSEMBLY
Filed July 14, 1948
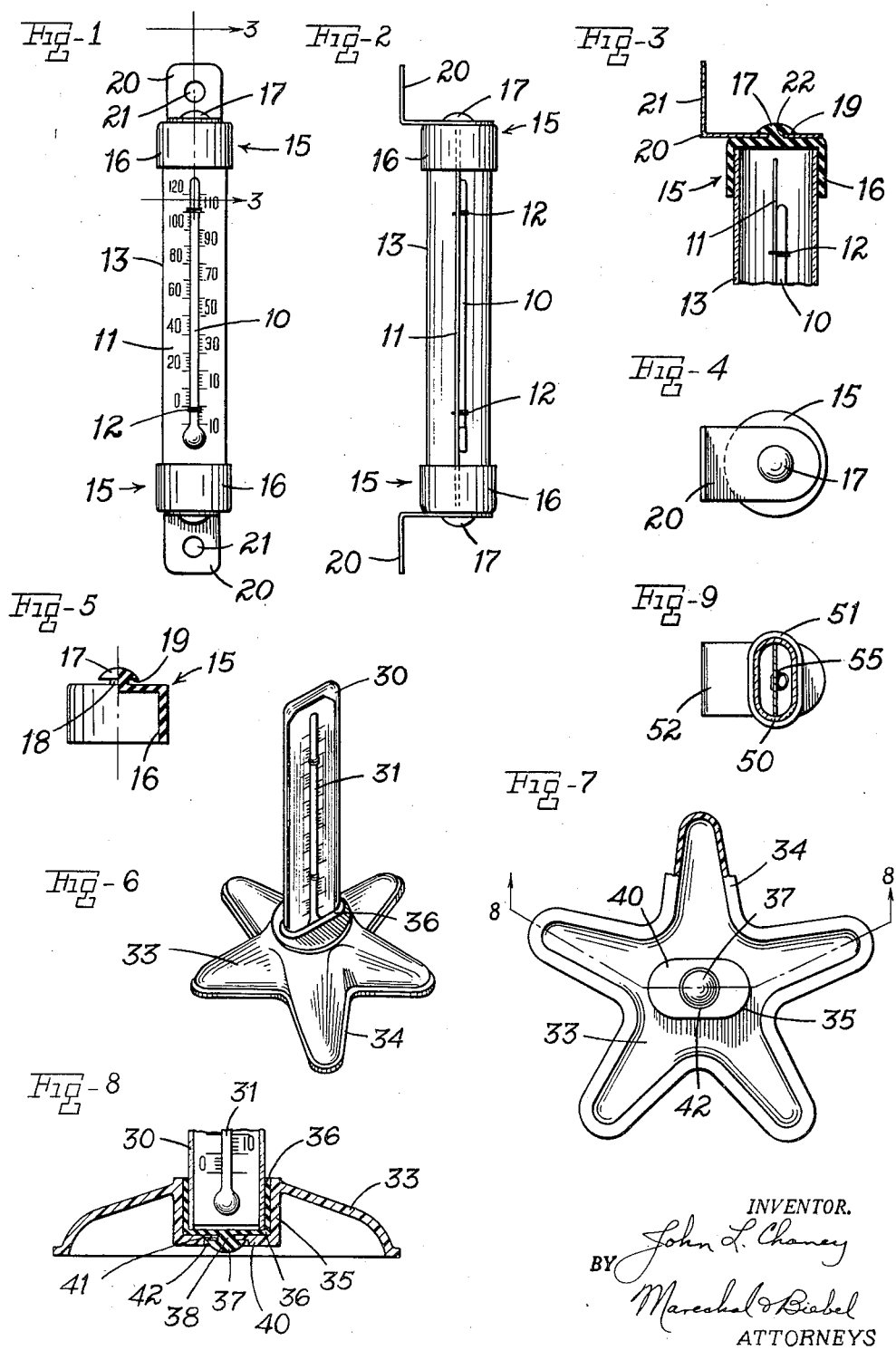
INVENTOR.
John L. Chaney
BY Mareschal & Biebel
ATTORNEYS Patented May 8, 1951

2,552,257

UNITED STATES PATENT OFFICE 2,552,257

THERMOMETER ASSEMBLY

John L. Chaney, Lake Geneva, Wis.

Application July 14, 1948, Serial No. 38,695

6 Claims. (Cl. 73—374)

This invention relates to thermometers, and more particularly to thermometer assemblies adapted for mounting on supporting surfaces such as walls, tables, desks or the like.

One of the principal objects of the invention is to provide a thermometer assembly of simple and economical construction which is readily mounted on a desired support, which is easy to assemble and adjust to a desired angle for viewing, and which affords substantial protection to the thermometer against moisture and also against damage from shock in use as well as during assembly.

Another object is to provide a thermometer assembly which includes one or more elastic mounting members receiving and supporting the casing for the thermometer tube and scale, and particularly to provide such a thermometer assembly wherein each mounting member includes an elastic button portion forming a simple resilient connection to a supporting bracket or base to speed the assembly operation and also to permit flexure during assembly and use, minimizing damage to the sensitive parts of the thermometer.

It is also an object of the invention to provide such a thermometer assembly which is adaptable to mounting on a vertical supporting surface such as a wall and also on a horizontal supporting surface such as a table or a desk.

Other objects and advantages of the invention will be apparent from the following description, the accompanying drawing and the appended claims.

In the drawing—

Fig. 1 is a view in front elevation of a thermometer assembly in accordance with the invention adapted for mounting on a wall;

Fig. 2 is a side elevation of the thermometer assembly of Fig. 1;

Fig. 3 is a fragmentary sectional view taken on the line 3—3 of Fig. 1 and on a somewhat larger scale.

Fig. 4 is a top view on the same scale as Fig. 3;

Fig. 5 is a detail view partly in side elevation and partly in vertical section of one of the rubber mounting members in the assembly of Figs. 1 to 4;

Fig. 6 is a view in perspective showing another form of thermometer assembly adapted for mounting on a desk or table;

Fig. 7 is a bottom view of the thermometer assembly of Fig. 6, a portion being broken away to illustrate details of construction.

Fig. 8 is a section on the line 8—8 of Fig. 7; and

Fig. 9 is a view in transverse section showing another form of thermometer assembly for mounting on a wall.

Referring to the drawing, which illustrates preferred embodiments of the invention, Figs. 1 to 5 show a thermometer assembly adapted for permanent mounting on a wall or similar supporting surface. The thermometer tube 10 is secured to a card or plate 11 forming the scale member therefor, the connection between the parts 10 and 11 being shown as provided by wire or staples 12, and this unit is enclosed within an open ended cylindrical casing 13 of glass or transparent plastic. Each end of casing 13 is received in a mounting member 15 of molded elastic rubber, and this member 15 includes a cup portion 16 of such dimensions as to receive the end of casing 13 in close frictional engagement, thus securing these parts together as well as protecting the interior of the tube from moisture, dust and other foreign matter, the elastic grip of cup portion 16 on casing 13 providing an effective seal over the open end of the casing.

The outer side of each mounting member 15 opposite its cup portion 16 is formed with an integral button portion comprising a round head 17 and a connecting neck 18 of substantially smaller diameter than head 17, thus leaving an annular shoulder 19 on the under side of the head which is substantially normal to the length of neck 18 and parallel to the adjacent outer surface of the cup portion 16. Each of these button portions is in turn attached to a supporting member 20, shown as an angle bracket of suitable sheet metal having a hole 21 in one leg thereof for receiving a mounting screw or nail. The other leg of each bracket 20 has a hole 22 therethrough of substantially the same diameter as the button neck 18, and the thickness of bracket 20 is substantially equal to the length of neck 18.

With this construction and relative thickness of the parts, the button head 17 can be readily deformed and compressed sufficiently to be forced through hole 22, the button readily snapping into position where it expands and returns to normal size and shape to form an interlocking connection with bracket 20, with its shoulder portion 19 seating on the outer surface of bracket 20 and resisting withdrawal therefrom. This assembly operation is quickly and easily carried out before casing 13 is mounted in place, and thereafter the ends of the casing are readily inserted in a pair of sockets to complete the assembly. Since the latter operation may be carried out without any tools, and since the mounting members are of soft and elastic material, the assembly operations can be carried on at considerable speed with minimum danger of breakage to any of the parts, the operation being facilitated by either wetting or applying a soapy material to the button.

In use, the brackets 20 may be screwed or nailed to a wall or other supporting surface as desired to provide a permanent mounting. Since the only connection between each bracket and casing 13 is through the elastic mounting member, and particularly through the button portion 17—18, it will be seen that the casing is free to have some degree of longitudinal or tilting movement with respect to brackets 20 without disconnection, thus providing for absorption of shock such as an accidental blow on any part of the assembly with minimum danger of injury to the casing or to the thermometer unit therein. On the other hand, the button head can be pulled through hole 22 if desired for purpose of disassembly or replacement, and it will also be noted that since the button neck 18 can rotate in the hole 22, the casing 13 can be readily adjusted by twisting to a desired position of the scale element 11 for convenient viewing while at the same time the interior of the casing and the parts therein are maintained effectively sealed.

Figs. 6 to 8 show a construction of thermometer assembly wherein the tubular casing 30 is closed at one end and is oblong in cross section to receive a thermometer unit 31 therein for viewing through its flat front wall. The base member 33 of this assembly is adapted to stand on a supporting surface such as a desk or table, having a flanged foot portion 34, and it may have a desired decorative shape such as the star configuration shown. The base 33 is hollow on its under side, and it is formed with a central recessed portion 35 forming a socket adapted to receive the lower end of the casing 30 and of the same configuration in cross section.

A rubber mounting member 36 forms the connection between casing 30 and base 33, this mounting member being of the same construction as the mounting member 15 but being of the proper oblong configuration and dimensions to receive the oblong casing 30 and to fit within the socket 35. The under side of the mounting member 36 includes a button portion having a head 37 and neck 38 similar to the parts 17 and 18 already described, and the bottom wall 40 of socket 35 is formed with a central hole 41 to receive the button neck 38. In the assembly of these parts, the mounting member is inserted in the base 33 and its button head 37 forced through hole 41 before casing 30 is mounted in place, so that the mounting member provides a firmly cushioned and flexible connection between the tube 30 and base member. It will also be noted in Fig. 8 that the bottom wall 40 of the recess 35 is located above the bottom plane of base member 33, and its under surface is recessed at 42 concentrically with the hole 41 to assure adequate clearance for button head 37 above the supporting surface wherein the device is placed.

Fig. 9 shows a thermometer assembly similar to that of Figs. 1 to 5 wherein the casing 50 is oblong in shape similarly to the casing 30, and it will be understood that tube 50 may be open at both ends, as in the case of casing 13, or may be closed at one end similarly to the casing 30. The mounting member 51 is of the same construction as mounting member 36, and it cooperates with a supporting angle bracket 52 of the same construction as brackets 20 to support the casing 50 and thermometer unit 55. It will accordingly be seen that this construction of mounting member may be applied to other shapes of casings for thermometer units to give similar advantages of quick and easy mounting, freedom from moisture, protection against breakage and shock, and ready adaptability to different types of installations. It will also be seen in connection with Figs. 6 to 9 that it is not necessary to use a pair of mounting members and supporting elements even for a wall mounting, particularly in the case of a tube having one end closed, a single mounting member being sufficient to support the thermometer unit under normal operating conditions.

While the forms of apparatus herein described constitute preferred embodiments of the invention, it is to be understood that the invention is not limited to these precise forms of apparatus and that changes may be made therein without departing from the scope of the invention, which is defined in the appended claims.

What is claimed is:

1. A thermometer assembly adapted to be mounted on a supporting surface and comprising a scale member having a thermometer element associated therewith, a tubular casing of transparent material having an open end for receiving said scale member and thermometer element therein, a mounting member of elastic material including a cup portion of such dimensions and configuration as to receive said open end of said casing in close frictional engagement therein to seal said end of said casing, a supporting member adapted for mounting on said supporting surface, and said mounting member including an outwardly projecting button portion having a head connected with said cup portion by a neck of lesser diameter than said head, said supporting member having a hole therethrough of such diameter smaller than said head as to receive said head therethrough upon deformation and compression of said head for expansion on the opposite side of said supporting member from said cup portion to effect an elastic connection between said mounting member and casing and said supporting member.

2. A thermometer assembly adapted to be mounted on a supporting surface and comprising a scale member having a thermometer element associated therewith, a hollow casing of transparent material having an open end for receiving said scale member and thermometer element therein, a mounting member of elastic material including a cup portion of such dimensions and configuration as to receive said open end of said casing in close frictional engagement therein to seal said end of said casing, a supporting member adapted for mounting on said supporting surface, said mounting member including an outwardly projecting button portion having a head connected with said cup portion by a neck of lesser diameter than said head, said supporting member having a hole therethrough of such diameter smaller than said head, as to receive said head therethrough upon deformation and compression of said head, and the surface of said head adjacent said neck forming an annular shoulder substantially normal to the length of said neck and adapted to seat upon said supporting member following passage of said head through said hole.

3. A thermometer assembly of the character described comprising a tubular casing having a thermometer element and associated scale therein, a supporting member for said casing including a portion having a hole therethrough, and a mounting member of elastic material forming an elastic connection between said casing and said supporting member, said mounting member including a cup portion receiving one end of said casing in elastic gripping engagement, and said mounting member also including an elastic button portion having a head connected with said cup portion by a neck of lesser diameter than said head, said head being of such diameter greater than said hole as to be compressed therethrough into expanded interlocking engagement with said supporting member on the opposite side of said supporting member from said cup portion.

4. A thermometer assembly adapted to be mounted on a supporting surface and comprising a scale member having a thermometer element associated therewith, a tubular casing of transparent material having an open end for receiving said scale member and thermometer element therein, a mounting member of molded elastic rubber including a cup portion of such dimensions and configuration as to receive said open end of said casing in close frictional engagement therein to seal said end of said casing, a supporting bracket of sheet material having a hole therethrough, said mounting member including an integral button portion having a head connected with said cup portion by a neck of lesser diameter than said head, said head being of such diameter greater than said hole as to be receivable completely through said hole upon compression and deformation and thereafter to expand into interlocking engagement with the opposite surface of said bracket from said cup portion for forming an elastic connection between said mounting member and said bracket.

5. A thermometer assembly adapted to be mounted on a supporting surface and comprising a scale member having a thermometer element associated therewith, a tubular casing of transparent material having an open end for receiving said scale member and thermometer element therein, a mounting member of elastic material including a cup portion of such dimensions and configuration as to receive said open end of said casing in close frictional engagement therein to seal said end of said casing, a supporting base member adapted to stand on said supporting surface, said base member having a recessed portion in an upper part thereof forming a socket of such configuration as to seat said mounting member therein, said mounting member including an elastic button portion projecting from the bottom of said cup portion and having a head connected with said cup portion by a neck of lesser diameter than said head, the bottom wall of said socket having a hole therethrough of such diameter smaller than the diameter of said head as to receive said head completely therethrough upon compression and deformation of said head to effect an elastic connection between said base member and said mounting member.

6. A thermometer assembly adapted to be mounted on a horizontal supporting surface and comprising a base member adapted to stand on said surface, a scale member having a thermometer element associated therewith, a tubular casing of transparent material having an open end for receiving said scale member and thermometer element therein, a mounting member of elastic material including a cup portion of such dimensions and configuration as to receive said open end of said casing in close frictional engagement therein to seal said end of said casing, said base member having a recessed portion in an upper part thereof forming a socket of such configuration as to seat said mounting member therein, said mounting member including an elastic button portion projecting from the bottom of said cup portion and having a head connected with said cup portion by a neck of lesser diameter than said head, the bottom wall of said socket having a hole therethrough of such diameter smaller than the diameter of said head as to receive said head completely therethrough upon compression and deformation of said head to effect a resilient connection between said base member and said mounting member, said bottom wall of said socket being positioned above the bottom plane of said base member to provide clearance for said head above said supporting surface when said base member is positioned thereon.

JOHN L. CHANEY.

REFERENCES CITED

The following references are of record in the file of this patent:

UNITED STATES PATENTS

| Number | Name | Date |
|---|---|---|
| 1,345,795 | Milker | July 6, 1920 |
| 2,114,071 | Chaney et al. | Apr. 12, 1938 |
| 2,297,792 | Neuwirth | Oct. 6, 1942 |